(12) United States Patent
Grueber et al.

(10) Patent No.: US 8,910,588 B2
(45) Date of Patent: Dec. 16, 2014

(54) POLYURETHANE ROLLER COATING DEVICE FOR CARPET BACKING

(75) Inventors: Heinz Grueber, Toenisvorst (DE); Manfred Grueber, legal representative, Toenisvorst (DE); Michael Harnesberger, Simpsonville, SC (US)

(73) Assignee: Kusters Zima Corporation, Spartanburg, SC (US)

( * ) Notice: Subject to any disclaimer, the term of this patent is extended or adjusted under 35 U.S.C. 154(b) by 0 days.

(21) Appl. No.: 13/102,599

(22) Filed: May 6, 2011

(65) Prior Publication Data
US 2012/0000417 A1      Jan. 5, 2012

Related U.S. Application Data

(63) Continuation of application No. 12/885,871, filed on Sep. 20, 2010, now abandoned, which is a continuation (Continued)

(51) Int. Cl.
*B05C 1/08*      (2006.01)
*B29C 65/00*    (2006.01)
(Continued)

(52) U.S. Cl.
CPC .............. *B29C 39/18* (2013.01); *B29K 2075/00* (2013.01); *B05C 1/0813* (2013.01); *B29C 66/83411* (2013.01); *B29L 2031/7322* (2013.01); *B32B 37/1284* (2013.01); *B32B 7/12* (2013.01); *B29C 65/526* (2013.01); *D06N 7/0036* (2013.01); *B32B 2471/02* (2013.01); *B32B 2375/00* (2013.01); *B29C 66/83415* (2013.01); *B29C 66/83413* (2013.01); *B29L 2009/00* (2013.01)
USPC ............. 118/304; 118/57; 118/224; 118/253; 118/257; 118/259; 118/33

(58) Field of Classification Search
CPC .............. B29C 39/18; B29C 66/83411; B29C 66/83413; B29C 66/83415; B29C 65/526; B32B 7/12; B32B 37/1284; B32B 2375/00; B32B 2471/02; D06N 7/0036; B29K 2075/00; B29L 2009/00; B29L 2031/7322; B05C 1/0813
USPC ........... 118/57, 224, 249, 253, 255, 257, 259, 118/33, 304; 427/428.13; 156/578
See application file for complete search history.

(56) References Cited

U.S. PATENT DOCUMENTS 2,015,806 A      10/1935   Menger
2,333,902 A  *  11/1943   Thiele et al. .................. 118/223
(Continued)

FOREIGN PATENT DOCUMENTS

DE    299 05 027       6/1999
WO    WO 99/67027      12/1999
WO    WO 03/039869      5/2003

OTHER PUBLICATIONS

European Search Report, dated Oct. 31, 2011, issued in corresponding European Patent Application No. 05753817.5.

(Continued)

*Primary Examiner* — Laura Edwards
(74) *Attorney, Agent, or Firm* — Kenyon & Kenyon LLP

(57) ABSTRACT

A device for applying a polyurethane mixture to a backstitch side of a greige includes: a tensioning roller rotatable in a first direction; an application roller arranged adjacent to the application roller and rotatable in a second direction opposite to the first direction, the tensioning roller and the application roller positioned transversely and adjacent to a path of travel of the greige on the backstitch side of the greige, the tensioning roller rotatable against a feed direction of the greige, the application roller rotatable in the feed direction of the greige; and a dispenser configured to create a puddle of the polyurethane mixture between the tensioning roller and the application roller.

20 Claims, 15 Drawing Sheets

Related U.S. Application Data of application No. 12/697,935, filed on Feb. 1, 2010, now abandoned, which is a continuation of application No. 12/469,540, filed on May 20, 2009, now abandoned, which is a continuation of application No. 12/246,204, filed on Oct. 6, 2008, now abandoned, which is a continuation of application No. 12/033,673, filed on Feb. 19, 2008, now abandoned, which is a continuation of application No. 11/810,329, filed on Jun. 4, 2007, now abandoned, which is a continuation of application No. 11/582,196, filed on Oct. 16, 2006, now abandoned, which is a continuation of application No. 11/301,973, filed on Dec. 12, 2005, now abandoned, which is a continuation of application No. 11/078,558, filed on Mar. 10, 2005, now abandoned, and a continuation-in-part of application No. 10/961,930, filed on Oct. 8, 2004, now Pat. No. 7,638,008.

(60) Provisional application No. 60/574,112, filed on May 25, 2004.

(51) Int. Cl.
  *B32B 37/12* (2006.01)
  *B32B 7/12* (2006.01)
  *B29C 65/52* (2006.01)
  *D06N 7/00* (2006.01)
  *B29C 39/18* (2006.01)
  *B29K 75/00* (2006.01)
  *B29L 31/00* (2006.01)
  *B29L 9/00* (2006.01)

(56) References Cited

U.S. PATENT DOCUMENTS

| | | |
|---|---|---|
| 3,046,177 A | 7/1962 | Hankins |
| 3,123,508 A | 3/1964 | Waugh |
| 3,590,425 A | 7/1971 | Lieberman |
| 3,654,021 A | 4/1972 | Henkler |
| 3,664,863 A | 5/1972 | Dijkhuizen |
| 3,755,212 A | 8/1973 | Dunlap et al. |
| 3,821,056 A | 6/1974 | Reardon |
| 3,821,130 A | 6/1974 | Barron et al. |
| 3,849,156 A | 11/1974 | Marlin et al. |
| 3,862,879 A | 1/1975 | Barron et al. |
| 3,926,700 A | 12/1975 | Hopkins et al. |
| 4,022,941 A | 5/1977 | Prokai et al. |
| 4,035,529 A | 7/1977 | Meisert et al. |
| 4,132,817 A | 1/1979 | Tillotson |
| 4,156,041 A | 5/1979 | Gilbert |
| 4,171,395 A | 10/1979 | Tillotson |
| 4,237,816 A | 12/1980 | Shimono et al. |
| 4,325,995 A | 4/1982 | Tamura et al. |
| RE31,115 E | 1/1983 | Catallo |
| 4,405,393 A | 9/1983 | Tillotson |
| 4,427,729 A | 1/1984 | Messer |
| 4,455,845 A | 6/1984 | Schiffer |
| 4,474,836 A | 10/1984 | Lukoschek |
| 4,512,831 A | 4/1985 | Tillotson |
| 4,515,646 A | 5/1985 | Walker et al. |
| 4,595,436 A | 6/1986 | Walker et al. |
| 4,715,912 A | 12/1987 | Tillotson |
| 4,796,559 A | 1/1989 | Lohse |
| 5,045,375 A * | 9/1991 | Davis et al. .............. 428/96 |
| 5,107,790 A | 4/1992 | Sliker et al. |
| 5,160,763 A | 11/1992 | Mims et al. |
| 5,262,193 A | 11/1993 | Louks et al. |
| 5,545,276 A | 8/1996 | Higgins |
| 5,604,267 A | 2/1997 | Duffy |
| 5,612,113 A | 3/1997 | Irwin |
| 5,631,048 A | 5/1997 | Kinose et al. |
| 5,908,701 A | 6/1999 | Jennings et al. |
| 6,264,775 B1 | 7/2001 | Holeschovsky et al. |
| 6,271,276 B1 | 8/2001 | Gribble et al. |
| 6,299,715 B1 | 10/2001 | Langsdorf et al. |
| 6,328,833 B1 | 12/2001 | Holeschovsky et al. |
| 6,533,863 B2 | 3/2003 | Robbins |
| 6,908,641 B2 | 6/2005 | Robbins |
| 6,991,745 B2 | 1/2006 | Fleming |
| 7,018,471 B2 | 3/2006 | Duwendag et al. |
| 7,638,008 B2 | 12/2009 | Hamrick et al. |
| 2002/0031636 A1 | 3/2002 | Brown et al. |
| 2002/0034606 A1 | 3/2002 | Miller et al. |
| 2002/0074073 A1 | 6/2002 | Hamrick et al. |
| 2002/0121328 A1 | 9/2002 | Kurth |
| 2002/0172772 A1 * | 11/2002 | Robbins .............. 427/356 |
| 2003/0114062 A1 | 6/2003 | Scott et al. |
| 2004/0086683 A1 | 5/2004 | Higgins et al. |
| 2004/0101630 A1 | 5/2004 | Buecher et al. |
| 2004/0123934 A1 | 7/2004 | Hamrick et al. |
| 2005/0025930 A1 | 2/2005 | Hamrick et al. |

OTHER PUBLICATIONS

International Search Report and Written Opinion, dated Jun. 3, 2008, issued in corresponding International Application No. PCT/US05/18463.

* cited by examiner

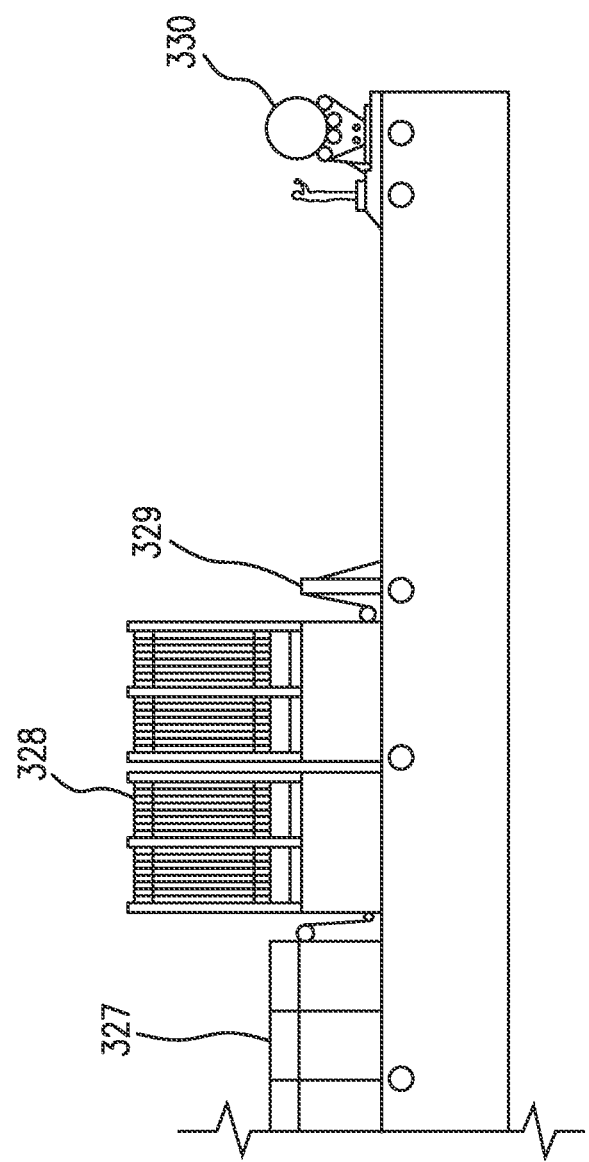

POLYURETHANE ROLLER COATING DEVICE FOR CARPET BACKING

CROSS-REFERENCE TO RELATED APPLICATIONS

The present application is a continuation of U.S. patent application Ser. No. 12/885,871 filed on Sep. 20, 2010, now abandoned, which is a continuation of U.S. patent application Ser. No. 12/697,935 filed on Feb. 1, 2010, now abandoned, which is a continuation of U.S. patent application Ser. No. 12/469,540 filed on May 20, 2009, now abandoned, which is a continuation of U.S. patent application Ser. No. 12/246,204 filed on Oct. 6, 2008, now abandoned, which is a continuation of U.S. patent application Ser. No. 12/033,673 filed on Feb. 19, 2008, now abandoned, which is a continuation of U.S. patent application Ser. No. 11/810,329 filed on Jun. 4, 2007, now abandoned, which is a continuation of U.S. patent application Ser. No. 11/582,196 filed on Oct. 16, 2006, now abandoned, which is a continuation of U.S. patent application Ser. No. 11/301,973 filed on Dec. 12, 2005, now abandoned, which is a continuation of U.S. patent application Ser. No. 11/078,558 filed on Mar. 10, 2005, now abandoned, which claims the benefit of U.S. Provisional Application No. 60/574,112 filed on May 25, 2004, and this application is a continuation-in-part of U.S. patent application Ser. No. 10/961,930 filed on Oct. 8, 2004 now U.S. Pat. No. 7,638,008, each of which is expressly incorporated herein in its entirety by reference thereto.

INCORPORATION BY REFERENCE

Each of U.S. patent application Ser. No. 10/961,930, entitled "Improved Polyurethane Roller Coating Process for Carpet Backing," filed on Oct. 8, 2004, and U.S. Provisional Application Ser. No. 60/574,112, filed on May 25, 2004, is expressly incorporated herein in its entirety by reference thereto.

FIELD OF THE INVENTION

The present invention relates to improved methods for adhering secondary backing to tufted or woven carpeting greige employing polyurethane adhesive systems. The present invention also relates to devices for applying a polyurethane mixture to a backstitch side of a greige.

BACKGROUND OF THE INVENTION

Polyurethanes are produced in four different principal forms including elastomers, coatings, flexible foams, and cross-linked foams. Polyurethane foams are produced by reacting isocyanate compounds with polyol compounds generally in the presence of catalysts, surfactants, and other auxiliary agents. At the start of polyurethane foam production, the reactive raw materials are held as liquids in large, stainless steel tanks. These tanks are equipped with agitators to keep the materials fluid. A metering device is attached to the tanks so that the appropriate amount of the reactive material can be pumped out. Generally, the ratio of polyol to isocyanate is about 2:1; and the ratio of components is strictly metered to control the characteristics of the resulting polymers. The reacting materials are then mixed and dispensed. Reaction between the isocyanate and the polyol, usually referred to as the gel reaction, leads to the formation of a polymer of high molecular weight. This reaction increases the viscosity of the mixture and generally contributes to cross-link formation. The second major reaction occurs between isocyanate and water. This reactive produces carbon dioxide gas which promotes foaming causing the volume of the urethane polymer to grow. In some instances, auxiliary blowing agents are added to further increase the volume of the polymer.

Both the gel and blow reactions occur in foams blown partially or totally with carbon dioxide gas. In order to obtain a good urethane foam structure, the gel and blow reactions must proceed simultaneously and at optimum balance rates. For example, if the carbon dioxide generation is too rapid in comparison with the gel reaction, the foam tends to collapse. Alternatively, if the gel reaction is too rapid in comparison with the blow reaction generating carbon dioxide, the rise of the foam will be restricted resulting in high density form. In practice, the balancing of these two reactions is controlled by the natures of catalysts and auxiliary agents used in the process.

It is customary in the carpet and rug industry to use various forms of filled and unfilled latex or polyurethane to coat the back of carpet. The coating is used to bond the face fibers to the primary backing and also thereby creating good tuft bind or fiber lock, and to bond secondary backing material to the greige (fibers/primary backing). For example, carpets having attached polyurethane layers as backing are described in U.S. Pat. Nos. 3,755,212; 3,821,130; 3,862,879; 4,022,941; 4,515,646; 5,604,267; 5,908,701; and 6,299,715. A key property of the carpet produced by these methods is annealing strength, or the force required to delaminate or separate the secondary backing from the carpet. In order to achieve optimal annealing strength, the secondary backing must be in direct contact with the greige, and a sufficient amount of adhesive must be between the greige and the secondary backing to thoroughly wet the fibers. A second key property is fiber lock, or a measure of the force necessary to pull face fibers from the carpet.

The most widely used annealing adhesive is latex. Latex is typically applied by methods involving roll over flatbed or roll over roll processes. Regardless, of the method used, the greige is coated with an adhesive precoat of latex, and the secondary backing, also coated with latex, is married to the greige and cured.

Although, latex is a popular adhesive, carpet prepared from latex displays numerous shortcomings. For example, the strength and hydrolytic stability of latex is less than desired, and latex is less durable over time than alternative polymer systems such as PVC plastisol or polyurethane. Moreover, latex curing requires the evaporation of large amounts of water during cure, a process that is both expensive and energy intensive. Heating latex annealed carpet to achieve timely curing requires temperatures in at least the range of 70° C., and these temperatures may cause some carpet fibers and backing materials to shrink or change appearance and properties. To minimize the cost of latex adhesives, substantial quantities of filler material are added. The use of latex filler hinders the effective recycling of manufacturing remnants and used carpet at the end of its life cycle.

Alternatively, polyurethane adhesives have been employed to form carpet with superior annealing strength and other desirable physical properties. However, despite the advantages of polyurethane, cost and technical problems have kept it from widespread use in the industry as a coating, and even more rarely as a flexible foam.

Attempts to replace latex with polyurethane have resulted in a variety of new problems, requiring modifications to the usual latex annealing process. One striking example is the difficulty associated with placing polyurethane onto a greige material, while maintaining the necessary adhesiveness to attach the second backing. After the pre-polymers have been mixed and polymerization begins polyurethane soon begins to lose its adhesive properties. In addition, because the blow reaction substantially increases the volume of the polyurethane layer, even small irregularities in the application of the polyurethane components to the greige may result in unacceptable variations in the depth of the resulting polyurethane foam layer.

Loss of adhesiveness is generally not a problem with the use of latex. Conventional latex maintains its adhesiveness and viscosity during processing, even into the curing oven. Following application of latex adhesive to both the greige and the secondary backing the two components are married and as a result of the latex properties, good temporary adherence of the secondary backing to the greige is observed. In the curing oven, the latex viscosity does not drop significantly as a significant portion of water is evaporated. Thus, the secondary backing satisfactorily adheres to the greige.

On the other hand, polyurethane application from bulk troughs, common in latex systems, is made very difficult due to premature polymerization in the delivery line. Typically, polyurethane is applied as "froth," polymerized prior to application and dispensed on the primary or secondary backing before the upstream edge of a doctor blade. However, unless the manufacturer guards against premature polymerization the delivery line becomes clogged, thereby retarding the flow of polyurethane to the dispensing apparatus. The doctor blade will also tend to foul with polyurethane that adheres and cures. In addition polyurethane begins to lose its adhesiveness soon after polymerization begins unless the manufacturer controls the polymerization rate by using heat sensitive catalysts or other chemical agents designed to maintain the viscosity of the polyurethane. Regardless of the manufacturer's attempts at controlling premature polymerization, the manufacturer has only a finite amount of time after the pre-polymers (polyol and isocyanate) have been mixed in which to apply the polyurethane and contact the greige to the backing before the polymer begins to lose its adhesive properties.

When chemical agents are added to control premature polymerization and maintain viscosity to enable the polyurethane to penetrate the fibers and achieve good tuft bond and maintain adhesiveness to affix the secondary backing, the resulting mixture typically will not cure quickly without oven curing. Oven curing adds time and cost to the finishing process, and will also adversely affect some fibers by matting or shrinkage.

In an attempt to combat the rapid loss of adhesiveness manufacturers have applied one coating of polyurethane to the greige as fiber lock and a second coating of polyurethane just prior to contacting the secondary backing to insure sufficient adhesion between the backings. Even with the additional polyurethane, the slow advancement of most commercial carpet lines, and the inherent lack of adhesiveness associated with polyurethane, does not allow for the desired adherence between the greige and the secondary backing without the use of considerable and expensive quantities of the pre-polymers.

To extend the coverage of a given quantity of pre-polymers, it is customary to add filler material to the mixture. However, filler materials are generally abrasive and complicate the application of the polyurethane mixture by either wearing on applicator parts or increasing the tendency of lines and applicators to clog or apply unevenly.

Curing the backing to the greige is also complicated because of the considerable decrease in viscosity of the polyurethane prior to cure. The viscosity of the polyurethane, and likewise its adhesiveness, may decrease to only 10% of its initial value prior to application of the secondary backing as the catalyzed polyurethane-forming reaction begins to exert its effect. The greatest increase in viscosity is often exhibited over the temperature range from ambient to about 70° C., where the polyurethane catalysts are not optimally active. At 70° C., substantial volatiles may be released. As a result, if the initial adherence of the secondary backing to the greige is insufficient the secondary backing may separate during this period of low viscosity.

In an attempt to address the problems associated with the use of polyurethane several changes to the underlying process have been disclosed. For example, U.S. Pat. No. 6,264,775 offers the addition of various chemical thickening agents to the polyurethane to maintain viscosity and adhesiveness. Another process provides for the use of multiple applications of polyurethane to the primary backing prior to joining the secondary backing. See e.g., U.S. Pat. No. 6,299,715. Still another technique disclosed in U.S. Pat. No. 6,299,715, is the application of both polyurethane to the primary backing and another tacky composition to the secondary backing prior to joining the two backings. In U.S. Pat. No. 4,515,646, two of the present inventors even tried to use refrigerated isocyanate and polyol components without catalysts to prevent premature polymerization. Commonly owned WO 03/039869 proposed spraying a substantially water-free polyurethane on the greige and effecting the blow and curing with steam. None of these techniques have been favored over standard latex based carpet laminates, primarily due to the increased cost and complexity associated with building and using separate manufacturing lines to implement the new technologies, or the failure of the techniques to work in a production environment.

It would therefore be desirable to provide a polyurethane foam carpet annealing process requiring only a single application of the polyurethane, while providing acceptable fiber lock and annealing strength. It would also be desirable to provide a polyurethane annealing system which does not require excessive quantities of polyurethane to provide sufficient annealing strength. It would be beneficial to provide a polyurethane annealing system which does not require an oven for curing.

SUMMARY OF INVENTION

The present invention pertains to a polyurethane carpet annealing system which discloses several unique advantages over the prior art. First it requires only a single application of polyurethane. The lower amount of polyurethane employed in a single application significantly decreases the weight of the carpet and decreases raw material costs. Second, the polyurethane is blown and cured at near ambient temperatures, optimally utilizing only heating drums and possibly steam. The absence of an oven-curing step markedly decreases the time from application of the polyurethane to product roll-up. Third, one source of water for the blow reaction may be from steam applied to the polyurethane ingredients after they have been dispersed upon the greige. Fourth, the polyurethane is applied from a puddle between two rollers over the greige and one of these rollers may also advantageously serve to press the polyurethane into the greige. Fifth, a vacuum, blower, ultra sonic system, or combination of these may be employed, preferably prior to any application of steam or heating drums to increase the penetration of the polyurethane ingredients into the greige. The carpet produced by the process exhibits acceptable fiber lock and initial secondary backing adhesion without the use of large quantities of polyurethane and without the expensive oven curing step common in other annealing systems.

A device according to an example embodiment of the present invention includes: means for creating a puddle of a polyurethane mixture between an application roller and a tensioning roller positioned transversely and adjacent to a backstitch side of a greige, the polyurethane mixture including polyol, isocyanate, a filler and a catalyst; and means for applying the polyurethane mixture with at least one of the application roller and the tensioning roller as the greige is moved laterally with respect to the application roller and the tensioning roller to form a coating on the backstitch side of the greige that begins to cure into a polyurethane foam.

The device may include means for shaping the puddle of the polyurethane mixture with forced air.

The creating means may include means for dispensing the polyurethane mixture between the application roller and the tensioning roller, the dispensing means oscillating laterally across the greige between the application roller and the tensioning roller.

The dispensing means may include a plurality of dispensing heads oscillating laterally across the greige between the application roller and the tensioning roller.

The device may include a pressure roller arranged between the application roller and the tensioning roller on a face-side of the greige, the pressure roller for exerting a force on the greige in a direction toward the application roller and the tensioning roller.

The device may include ultrasonic means located downstream of the application roller for penetrating the polyurethane mixture into the backstitch side of the greige.

According to an example embodiment of the present invention, a device for applying a polyurethane mixture to a backstitch side of a greige includes: a tensioning roller rotatable in a first direction; an application roller arranged adjacent to the application roller and rotatable in a second direction opposite to the first direction, the tensioning roller and the application roller positioned transversely and adjacent to a path of travel of the greige on the backstitch side of the greige, the tensioning roller rotatable against a feed direction of the greige, the application roller rotatable in the feed direction of the greige; and a dispenser configured to create a puddle of the polyurethane mixture between the tensioning roller and the application roller.

The tensioning roller may be arranged upstream of the application roller in the path of travel of the greige.

The tensioning roller and the application roller may be positioned above the path of travel of the greige.

The tensioning roller may be rotatable at a speed different from a speed of travel of the greige.

The application roller may be rotatable at a speed different from a speed of travel of the greige.

The application roller may be rotatable at a first speed, and the tensioning roller may be rotatable at a second speed.

The first speed and the second speed may be different.

A space between the application roller and the tensioning roller may be adjustable.

The dispenser may include at least one dispensing head configured to oscillate laterally across the travel path of the greige between the application roller and the tensioning roller.

The dispenser may include a plurality of dispensing heads configured to oscillate laterally across the travel path of the greige between the application roller and the tensioning roller.

The tensioning roller may be rotatable at a speed less than a speed of travel of the greige.

The application roller may be rotatable at a speed greater than a speed of travel of the greige.

The device may include a pressure roller arranged between the application roller and the tensioning roller. The pressure roller may be positioned transversely and adjacent to the path of travel of the greige opposite to the application roller and the tensioning roller. The pressure roller may be configured to exert a force on the greige in a direction toward the application roller and the tensioning roller.

The device may include an ultrasonic device positioned downstream of the application roller in the path of travel of the greige and configured to impart ultrasonic energy to the greige to penetrate the polyurethane mixture into the backstitch side of the greige.

The device may include at least one pressure element arranged opposite to at least one of the application roller and the tensioning roller configured to press the greige therebetween.

The at least one pressure element may include at least one roller.

The device may include a first pressure element arranged opposite to the tensioning roller configured to press the greige therebetween and a second pressure element arranged opposite to the application roller configured to press the greige therebetween.

The first pressure element may include a first roller, and the second pressure element may include a second roller.

The device may include an air dam configured to maintain and shape the puddle of the polyurethane mixture with pressurized air.

BRIEF DESCRIPTION OF DRAWINGS

FIGS. 7A-7C illustrate first, second and third portions of an example embodiment of an entire carpet backing process line.

DETAILED DESCRIPTION OF THE INVENTION

Figure 1:
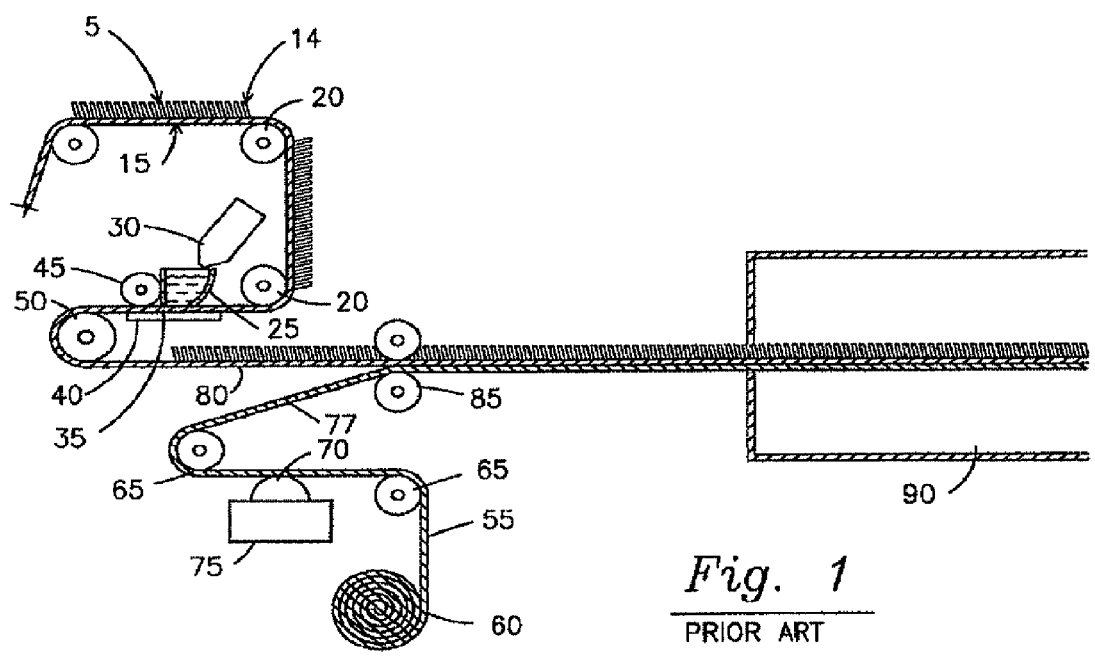
FIG. 1 illustrates a typical prior art latex-based carpet annealing process.

The present invention is designed to improve the annealing of secondary backing to tufted or woven carpeting utilizing a polyurethane adhesive system. Referring now to the drawings in more detail, FIG. 1 illustrates a typical prior art commercial latex-based carpet annealing process. The greige 5, with top carpet face 14 and bottom primary backing side 15 to which fiber lock adhesive is applied, is directed by rollers 20 to place the primary backing side 15 of the greige under trough 25, which is supplied with latex through line 30. The downstream edge of trough 25 serves as a doctor blade 35, in conjunction with plate 40. The doctor blade 35 is used to both even the application of latex and assist in pressuring latex into the primary backing. Adjusting the amount of latex applied also serves to adjust the force applied to urge the latex into the primary backing 15 and into the fibers of the tufted yarns and primary backing. Further penetration is provided by pressure roller 45. The carpet is then redirected by roller 50. Secondary backing SS is supplied from roll 60 and directed by rollers 65 across wheel-roll 70, which rotates in trough 75 filled with additional latex which coats the secondary backing 55. The coated secondary backing 77 is pressed onto the latex-coated greige 80 by travel through ligation rolls 85. The carpet then passes through oven 50 where water is removed from the latex, and the latex cures, adhering fibers and secondary backing to form a laminar carpet. The resulting carpet is relatively inexpensive to manufacture and provides adequate tuft bind and resistance to delamination, but suffers from the previously mentioned shortcomings of latex backed carpets.

It will be understood that in most prior art polyurethane backings, water is not added to the froth and the resulting polyurethane backing is not "blown," the only volume in the backing layer having been injected in the form of air in the froth. The present invention is directed to a flexible polyurethane foam that is blown, rather than merely a polyurethane coating.

Figure 2:
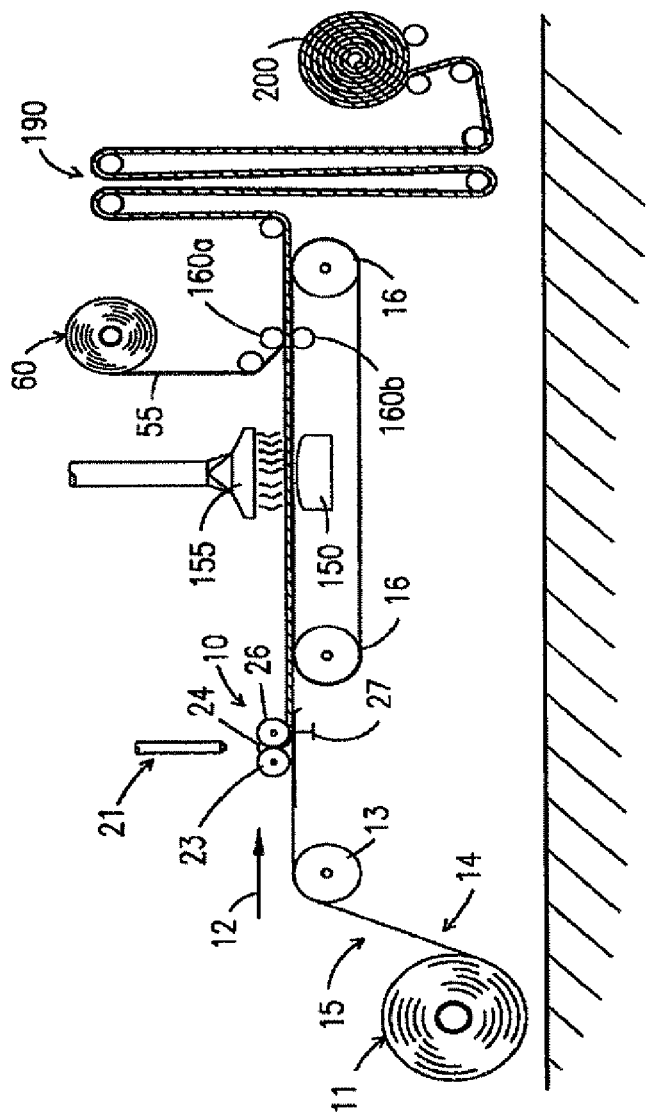
FIG. 2 illustrates the roller-delivered polyurethane coating process of the present invention

FIG. 2 illustrates a preferred dispensing apparatus for applying mixed polyurethane onto the greige. The greige 11, is fed in direction 12 past the dispensing apparatus 10. The dispensing apparatus 10 preferably comprises a polyurethane dispensing head 21, fed by a polyol tank, an iso tank, and a catalyst tank. Optimally, catalysts and other additives may be selected that can be premixed with one of either the polyol or iso mixtures.

Polyol tank contains polyol mixed with filler and surfactants, such as silicone. The iso tank contains isocyanate. The catalyst tank contains one or more catalysts and a small amount of water. Typically, there will be between two hundred fifty and five hundred parts filler per hundred parts of polyol and between about 0.05 to 3.0 parts of water per hundred parts of polyol. Contents of the polyol, iso and catalyst tanks are pumped to polyurethane coating head 21. The temperature of the polyol mixture may be controlled either by refrigerating the entire polyol tank or by passing tubing from the tank through a heat exchanger to achieve the desired temperature prior to mixing.

All of the ingredients may be temperature controlled as described in connecting with the polyol mixture above. In addition, there may be other additives such as stabilizers, antioxidants, antimicrobials, anti-mildew agents, colorants, flame retardants, penetrants, and chain extenders, all depending upon the characteristics desired in the resulting foam.

The illustrated polyurethane coating head 21 dispenses polyurethane mixture into a puddle 24 extending across a substantial width of the greige 11. The puddle 24 is formed by the proximity of tensioning roller 23 and application roller 26. In the illustrated embodiment, the tensioning roller 23 turns clockwise at a relatively low speed, creating a wiping action to maintain the roll clean and tensioning the greige 11. The application roller 26 rotates counterclockwise, and as it does so, pulls a polyurethane coating downward from the puddle onto the greige 11. The thickness of the polyurethane coating applied may be adjusted by speeding the rotation of the application roller 26 to bring down more polyurethane. The greige 11 may be pressured against one or both of tensioning roller 23 and application roller 26 by support 27. Preferably the greige 11 passing over the surfaces of tensioning roller 23 and application roller 26 effects a wiping action on the rollers 23, 26 and minimizes polyurethane buildup. Wiping action is naturally effected on tensioning roller 23 because it rotates its surface in the opposite direction to the travel of the greige 11. Wiping action on the application roller 26 is preferably effected by rotating that roller somewhat faster than the greige 11 is allowed to travel through the secondary backing process.

The adhesion of the polyurethane material to the greige 11 may be furthered by the use of a roller, a doctor blade, controlled vacuum, blower, ultrasonic waves or an air knife, and in some instances, by thinning the viscosity of the polyurethane material. An ultrasonically vibrated doctor blade is preferable when actually contacting the polyurethane material as the vibration tends to prevent adhesion and buildup on the doctor blade. Penetration into the greige is critical to achieving acceptable tuft bond and annealing strength.

By placing the mixing directly at the polyurethane dispensing head 21 closer to the actual application of the polyurethane components, there is less time for a reaction to occur before the components are on the greige 11, thereby reducing the chance of clogging the dispensing apparatus. The head 21, or preferably a plurality of transversely spaced heads 21, may move laterally across the greige 11 between the tensioning roller 23 and application roller 26 to keep the puddle 24 relatively even. Even with this arrangement, the polyurethane mixture may be thick and viscous so that an extremely strong or reinforced assembly is useful in supporting the rollers 23, 26 to prevent their longitudinal movement.

FIG. 2 illustrates the carpet finishing process according to the present invention. The greige 11 with carpet face 10 downward is fed onto a tenter roll 13 that directs the greige 11 to rollers 23, 26 of the dispensing apparatus 10, and the carpet face 14 is advanced over the support 27 using pulling rollers 16.

In FIG. 2, a layer of polyurethane polymer is deposited onto the primary backing side 15 as it passes over support 27 using rollers 23, 26. Preferably, the polyurethane is applied to the primary backing 15 at an area concentration of 3 to 5 ounces of polyurethane or about 6 to 40 ounces total mixture including fillers and additives per square yard or in a more preferred concentration of about 14 ounces total mixture per square yard. The 3 to 5 ounce per square yard range is the weight of only the polyurethane components, and does not include the weight of optional additives such as fillers or thinners that are useful aids to effective and economical coverage. The polyol and isocyanate pre-polymer components are laid onto the primary backing 15 by tensioning roller 23. The pre-polymers are preferably mixed just prior to dispensing from the polyurethane dispensing head 21 and subsequent application to the primary backing 15.

At this time, only a small amount of water is added which reacts and serves as a blowing agent. According to this method, the polymerization process does not begin to occur until just prior to the exit of the polyurethane components from the polyurethane dispensing head 21, and the polyurethane is quickly applied by rollers 23, 26 to the backing 15. This process and pressure between tensioning roller 23 and/or application roller 26 and support 27 allows the relatively low viscosity polyurethane to deeply penetrate the fibers in the primary backing, resulting in excellent fiber lock characteristics. Immediately after application of the polyurethane, optional aids to penetration such as the previously mentioned doctor blades, vacuums, or blowers may be most effectively employed as may be particularly desired when processing greige tufted with heavy yarns.

The polyurethane coated greige 11 is then optionally passed across a steam box 150, that is adjustable with respect to steam temperature, volume, and slot size. Steam box 150 adds more water to facilitate the blow reaction and heat to aid in accelerating the gel reaction. In addition the steam serves to enhance blooming of the yarns passing through the primary backing for deeper penetration and assures a more level coverage of polyurethane. A fume hood 155 is placed above the steam box 150 to capture escaping volatiles released with the steam. Conspicuously absent at this stage of the process is an oven curing step. Heat may also be applied to the carpet by passing it around oil or steam heated drums. A hot water circuit with a high volume of recirculation may be provided, e.g., to help achieve an even temperature profile across the drums. An oven is not necessary in the process because the polyurethane components are essentially kept separate until they are applied to the primary backing 15, therefore there is no need to dope the polyurethane components in order to severely slow the rate of polymerization. However, rather than as illustrated, steam or other heat is preferably applied after the coated greige 11 is joined with the secondary backing 55 unless it is necessary to advance the polyurethane curing reaction before marriage of the greige 11 with the secondary backing 55.

In a preferred embodiment of the present process temperatures are generally maintained within 40° C. of ambient temperature or in a more preferred embodiment within 20° C. of ambient temperature during the carpet manufacturing process. Under certain circumstances, volatiles may be released if the polyurethane exceeds approximately 43° C. In contrast, prior art polyurethane curing processes are required to utilize heat sensitive catalysts and other chemical additives to maintain sufficient viscosities to apply the polyurethane, from various holding lines and troughs, to the backing surface. These additives, and the absence of water, necessitate a heat curing stage.

After applying the polyurethane coating, and preferably before steaming or otherwise heating the coated greige 11, the coated greige 11 is rapidly pulled to merge rolls 160a,160b where the secondary backing 55, supplied from roll 60, contacts the coated greige 11. Due to the short time that elapses between the initial application of polyurethane and the merger of the secondary backing 55 with the coated greige 11, the polyurethane possesses sufficient tackiness to anneal the secondary backing in place.

The merge rolls 160a,160b may not only contact the secondary backing 55 to the coated greige, but also serve to gauge the height of the blown polyurethane, preferably at no more than about one-eighth inch in height, and to halt any additional volumization of the polyurethane. This is due to the merge rolls 160a,160b compressing the blown polyurethane and rupturing many of the still closed cells within the polyurethane. In a preferred embodiment, the secondary backing is a spun bonded fabric of nylon, polypropylene, polyester, polyethylene or similar fibers and may have a calendared surface. A spunbond fabric having a weight of between about 1.5 and 4 ounces per square yard is a suitable and inexpensive secondary backing. The absence of an oven curing step facilitates the use of relatively low melting point materials.

The independence gained by controlling the mixing of polyol and isocyanate has led to the removal of a curing station. The exclusion of this step has dramatically improved the processing speed of laminated carpets, cutting manufacturing time by as much as 50-60% without sacrificing the annealing strength or fiber lock properties of the carpet. The annealed carpet can then be cooled briefly on accumulator rolls 190 and rolled on take up roll 200 for storage and transport, typically in lengths of up to about 600 feet.

A number of variations to the described process are possible. For instance, the carpet may be fed over a vacuum or ultra sonic wave device in order to pull the viscous polyurethane deeper into the primary carpet backing after application of polyurethane by application roller 26. Also, if the heat from the steam box 150 is used prior to joining the greige 11 to the secondary backing 55 and the steam accelerates polymerization so that the polyurethane film has cured sufficiently to lose much of its tackiness, the secondary backing 55 may require coating to enhance its adherence to the coated greige product 11.

The secondary backing 55 may also be applied at a much earlier stage in the process. In fact, immediately after the polyurethane layer is deposited on the backing side 15 of the greige as it passes under the application roller 26, the secondary backing 55 may be applied, preferably by transition around a doctor bar or merge roller which causes the secondary backing 55 to come into contact with the polyurethane layer as the reaction of the prepolymers is just beginning. However, as discussed below, use of an intermediate station to enhance penetration of the polyurethane into the fibers of the primary backing and back stitches of the tufted yarns is frequently performed prior to applying the secondary backing. The polyurethane achieves much of its reaction between the primary backing side 15 and the secondary backing 55 and the use of steam box 150 and fume hood 155 accelerates this process and provides additional water to the reaction. Again passing under merge rollers 160a, 160b crushes the backing and effectively halts the foaming process so that the polyurethane layer does not gain additional height. The curing process is completed as the carpet passes through accumulator 190 and is finally wound on a master carpet roll 200.

Figure 3:
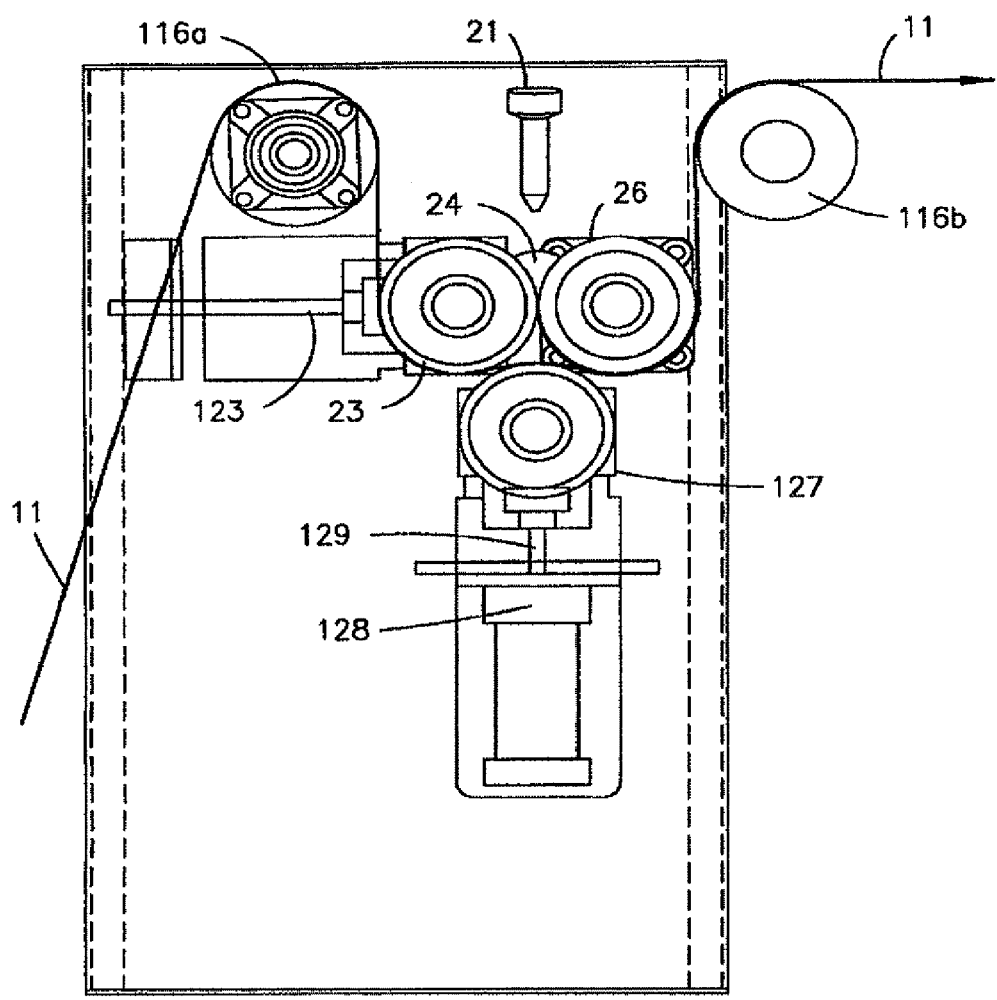
FIG. 3 illustrates a roller arrangement for applying polyurethane to the greige goods.

FIG. 3 shows an example of roller coating station 10 in greater detail with greige goods 11 passing over first directional roller 116a, downward and around clockwise driven tensioning roller 23 and counterclockwise driven application roller 26 upward to second directional roller 116b. Spacing between tensioning roller 23 and application roller 26 is adjustable utilizing linkage 123. As the greige 11 passes beneath rollers 23, 26 polyurethane is applied from puddle 24. Polyurethane puddle 24 is dispensed from dispensing head 21 which is preferably a mix head mounted for transverse movement where feed from a polyol tank including polyol and other ingredients typically including filler and catalyst is combined with isocyanate and additional catalyst. The number of dispensers 21 can vary and typically one mix head and dispenser for each meter in width of carpet is preferable. The polyol and isocyanate material coming to the mix head should stay at a constant temperature during the processing of a lot of greige. The preferred temperature is between 43° C. and 49° C., with a more generally suitable range of between 22° C. and 60° C., but in connection with some polyurethane mixtures and some carpet products, optimal results may be obtained at higher or lower temperatures. This temperature range is utilized to thin or lower the viscosity of the polyurethane mixture coming from the dispenser 21 and improve the penetration of the polyurethane in the primary backing and back stitches of the yarns of the greige 11. Because of the tendency of polyurethane to adhere to surfaces that it contacts, pressurized air is a preferred method of containing and shaping the polyurethane in the puddle 24.

The tensioning roller 23 and application roller 26 are precision rollers designed to apply the polyurethane material evenly across the width of the greige 11 and to maintain a consistent rate of application of polyurethane to each square yard of carpet. Because the length of the rollers is typically approximately four meters, and up to six meters in some cases, special construction may be necessary to keep the gaps between rollers 23, 26 even over their full length. In order to keep the puddle 24 between the rollers 23, 26, one roll runs clockwise and the other roll runs counterclockwise. In the embodiment illustrated in FIG. 3, the tensioning roller 23 runs clockwise and the application roller 26 runs counterclockwise, and it is preferred to have the clockwise roller run at a slower speed than the speed at which the greige 11 is fed while the counterclockwise roller runs faster. It will be understood that roller speeds will vary depending upon the construction of the greige product and the amount of polyurethane material to be applied. For instance, loop pile greige goods are generally easier to process to achieve good tuft bind and delamination strength than cut pile goods. In addition, greige tufted with finer yarns is generally more easily penetrated by a polyurethane mixture than greige tufted with thick or berber-like yarns.

The rollers 23, 26 can be run at a variety of speeds as long as the rollers wipe themselves clean, generally by the feed rate of the processed greige 11 being either faster or slower than the speed of rotation of rollers 23, 26, and thereby avoid any buildup on the rollers. The amount of polyurethane material applied from puddle 24 is determined by speed of the rollers 23, 26, the width of the gap between the rollers, and the viscosity of the polyurethane material. It is generally preferred that the viscosity of the polyurethane material be constant and the gap between rollers 23, 26 be kept constant and any changes in the amount of polyurethane material applied being controlled by changing roller speeds. However, adjustments to roller spacing or viscosity may be preferable in some instances.

In FIG. 3, a support roller 127 is also shown in order to apply upward pressure against the greige 11. The pressure applied by roller 127 is adjustable by controlling piston 128 that communicates upward pressure to the ends of roller 127 by means of linkage 129. The pressure applied by support roller 127 also affects the amount of polyurethane material being applied to the greige 11 and the pressure should be set at a constant during a run of carpet. Certain greige products will require a different pressure setting from the support roller 127 for optimal performance.

Figure 6A:
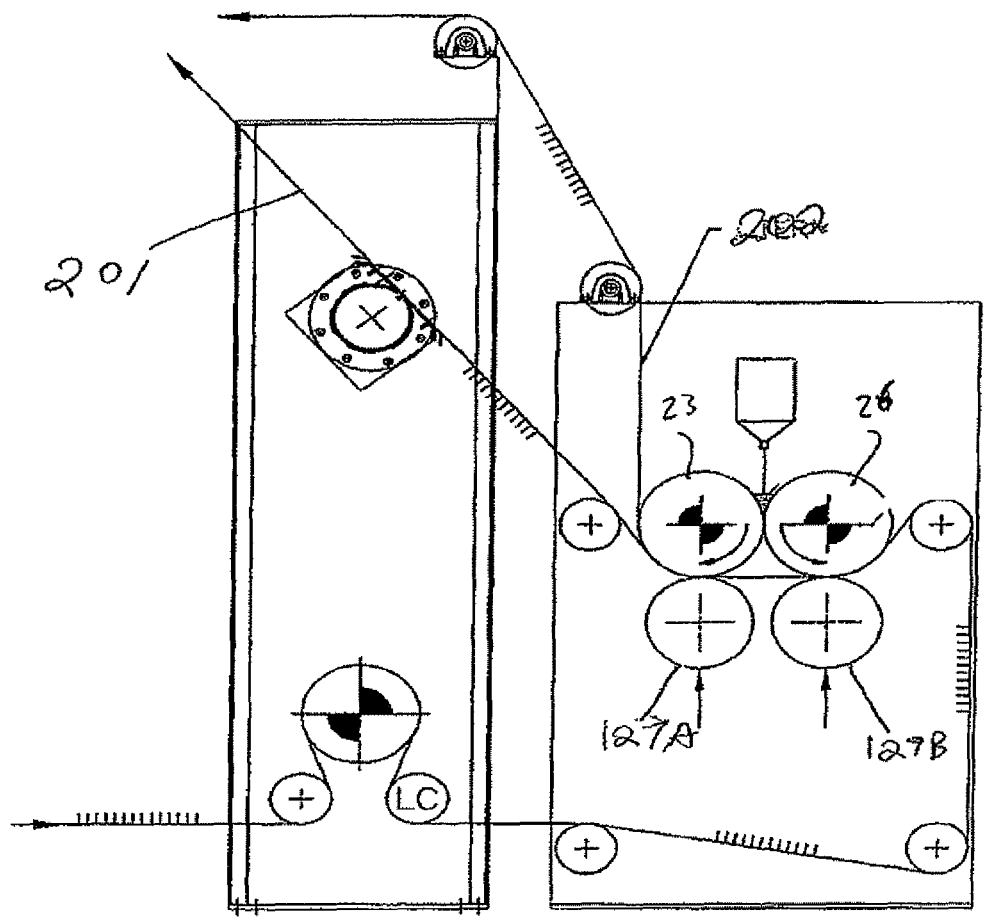
FIGS. 6A and 6B illustrate roller arrangements for applying polyurethane to greige goods.

In FIG. 6A, two support rollers 127A, 127B are illustrated, with one roller applying upward pressure to the greige 11 underneath the tensioning roller 23 and the other applying upward pressure beneath the application roller 26. FIG. 6A also illustrates two alternate carpet paths 201, 202, either of which may be employed depending on a downstream roller configuration.

Figure 6B:
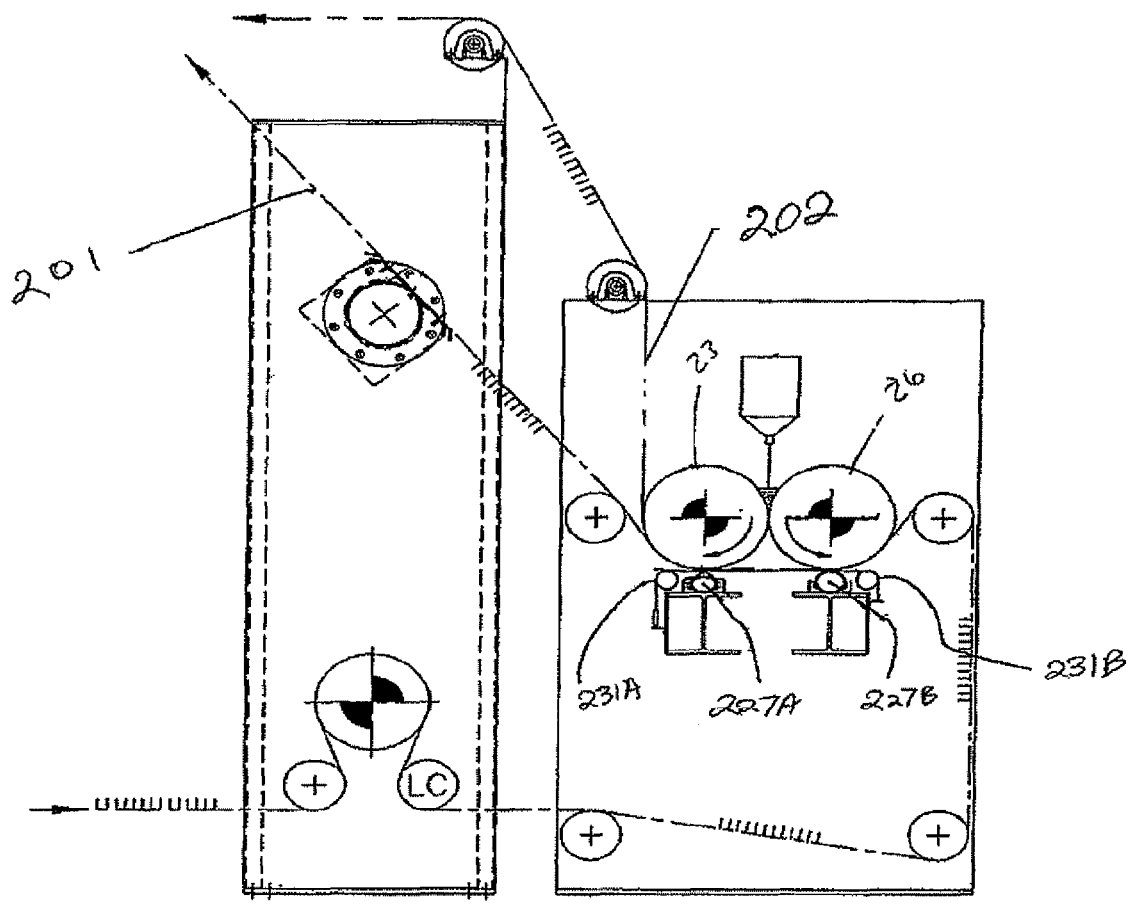

FIG. 6B illustrates an alternate configuration in which dual air bladders 227h, 227B are provided, one under each roller 23, 26 to support the greige 11 during application. Mini-rollers 231A, 232B are positioned adjacent the bladders to help apply tension to the greige.

Figure 4:
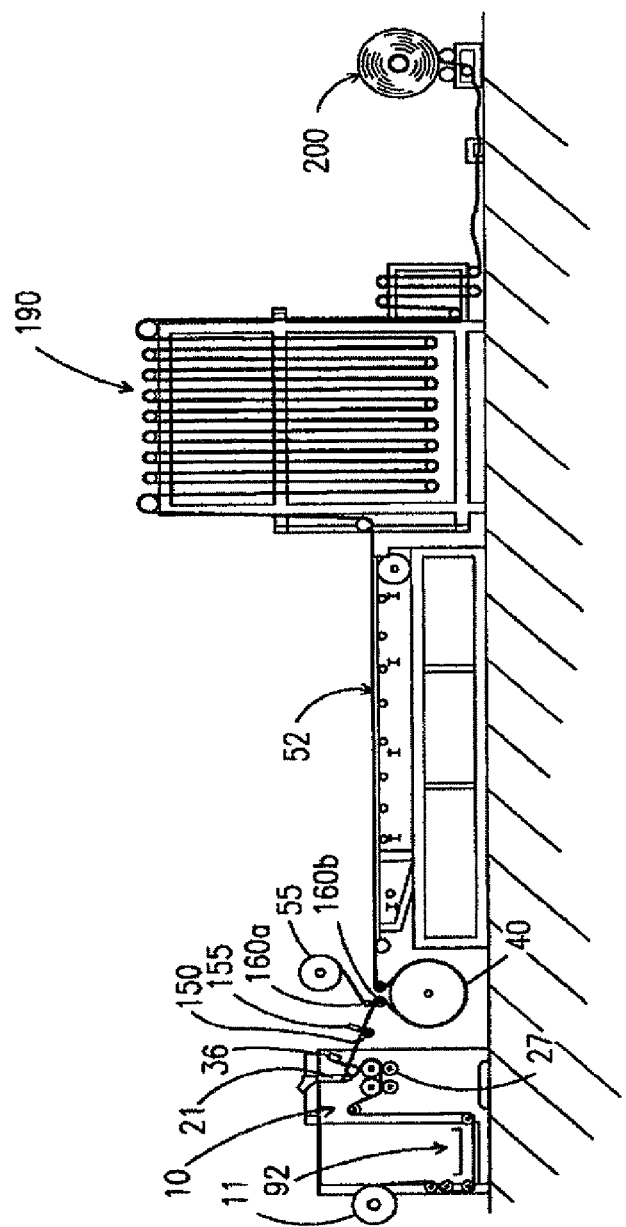
FIG. 4 is an alternative configuration of the roller-delivered polyurethane coating process of the present invention.

Turning then to FIG. 4, an alternative arrangement of the polyurethane roller applied backing system is illustrated. The greige goods 11 proceed about a J-box 92 to assist in controlling the carpet's entry into the roller applicator 10. After the greige 11 is coated with polyurethane, it passes by ultrasonic doctor blade 36 where the ultrasonic vibrations of the doctor blade prevent adhesion of the polyurethane material which would foul the blade and the pressure of the doctor blade 36 improves the penetration of the polyurethane mixture. The greige 11 then passes over steam box 150 and below fume head 155 and thereafter immediately has secondary backing 55 married to it by pinch rollers or nip rolls 160a,160b. Thereafter, the carpet passes to a heated drum such as heat can 40 which is preferably a hot oil can but could also be steam heated. Heat can 40 helps iron the secondary material 55 to the greige 11 and also accelerates the cure process allowing the carpet to be run at higher speeds and in a shorter distance to roll-up. The number and size of heat cans 40 may vary depending upon the run speed and space desired. No heat can 40 is required as additional heat is not necessary for curing a polyurethane mixture, merely time, and tenter frames and accumulators may be utilized if necessary. Indeed, after passing about heat can 40, the carpet is shown proceeding to tenter system 52 and accumulator 190 and thereafter to the roll-up of the finished carpet 200.

The timing of the marriage of secondary backing 55 to the coated greige 11 is critical. The reaction of the polyurethane material must be sufficiently complete to marry the secondary backing 55 to the greige 11. There is a relatively brief window in which the polyurethane material is sufficiently sticky to form a strong bond to the greige 11. If the greige 11 arrives too early, the adhesion to the backing 55 and resulting overall product will not be as strong as possible. Similarly, if the greige 11 arrives too late at the marriage point, the polyurethane material will be over-cured and the secondary backing 55 will not stick to the greige 11. The state of reaction of the polyurethane material at the marriage point can be changed by adding heat to the greige prior to the marriage point, changing the catalyst package to accelerate or decelerate reaction and curing, or adjusting the distance between the application rollers 23,26 and the marriage point. In the embodiment of FIG. 4, it is preferred to utilize a standard catalyst package, a standard distance to the marriage point, and to adjust the heat and water applied by the steam box 150 to increase the heat and accelerate the reaction as necessary or shut off the heat and slow the reaction, in order to have the polyurethane material at the appropriate state to marry the greige 11 with the secondary backing 55.

The embodiments of FIGS. 5A-5D illustrate alternative constructions that adjust the state of reaction of the polyurethane material at the marriage point by providing a method to adjust the distance between the application rollers 23, 26 and marriage point. Specifically, the unbacked greige 11 is passed through a J-box 91 and a tenter frame 92 to condition and control the greige prior to application of the polyurethane material. The greige 11 proceeds past application rollers 23, 26 and then to a moveable skying roll 147 adjustable between a low position 47 and a high position 247 shown in phantom, and the illustrated intermediate position 147 to allow the length of coated greige 11 intermediate the application rolls 23, 26 and nip rolls 160a, 160b at the marriage point with secondary backing 55 to be increased or decreased and thereby effect the completeness of the reaction of the polyurethane material at the marriage point. Either nip rolls 160a, 160b or subsequent rubber coated pressure rolls 66a,66b should be pressure controlled to ensure a complete marriage of the secondary backing 55 to the coated greige 11. Thereafter the carpet again passes around first heat can 40 and second heat can 41 to iron the secondary backing 55 to the greige 11 and speed the curing process. The carpet then goes through accumulator 190 to roll-up as the finished carpet product 200.

Figure 5A:
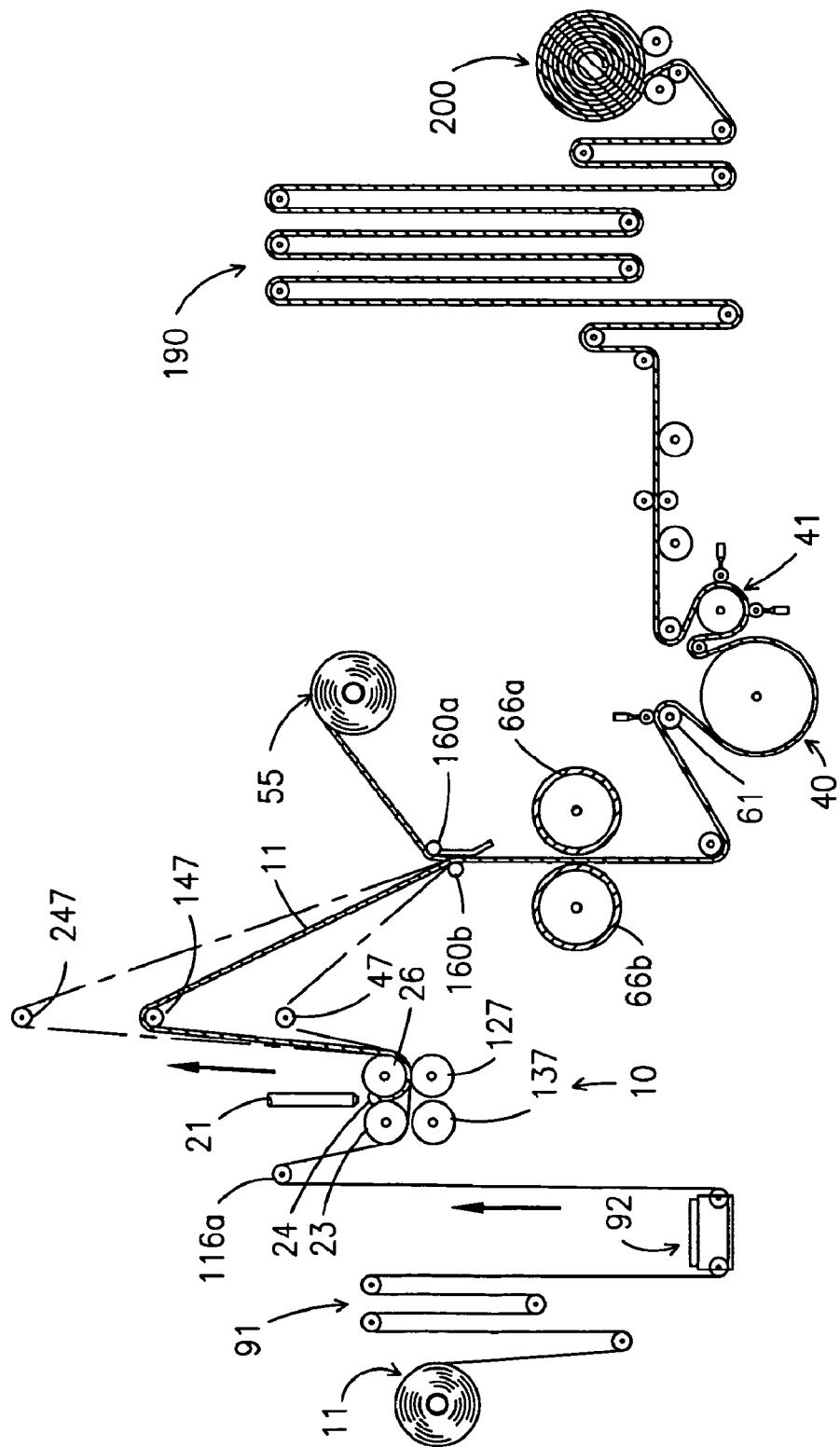
FIGS. 5A-5D are yet other alternative configurations of the roller-delivered polyurethane coating process of the present invention.
Figure 5B:
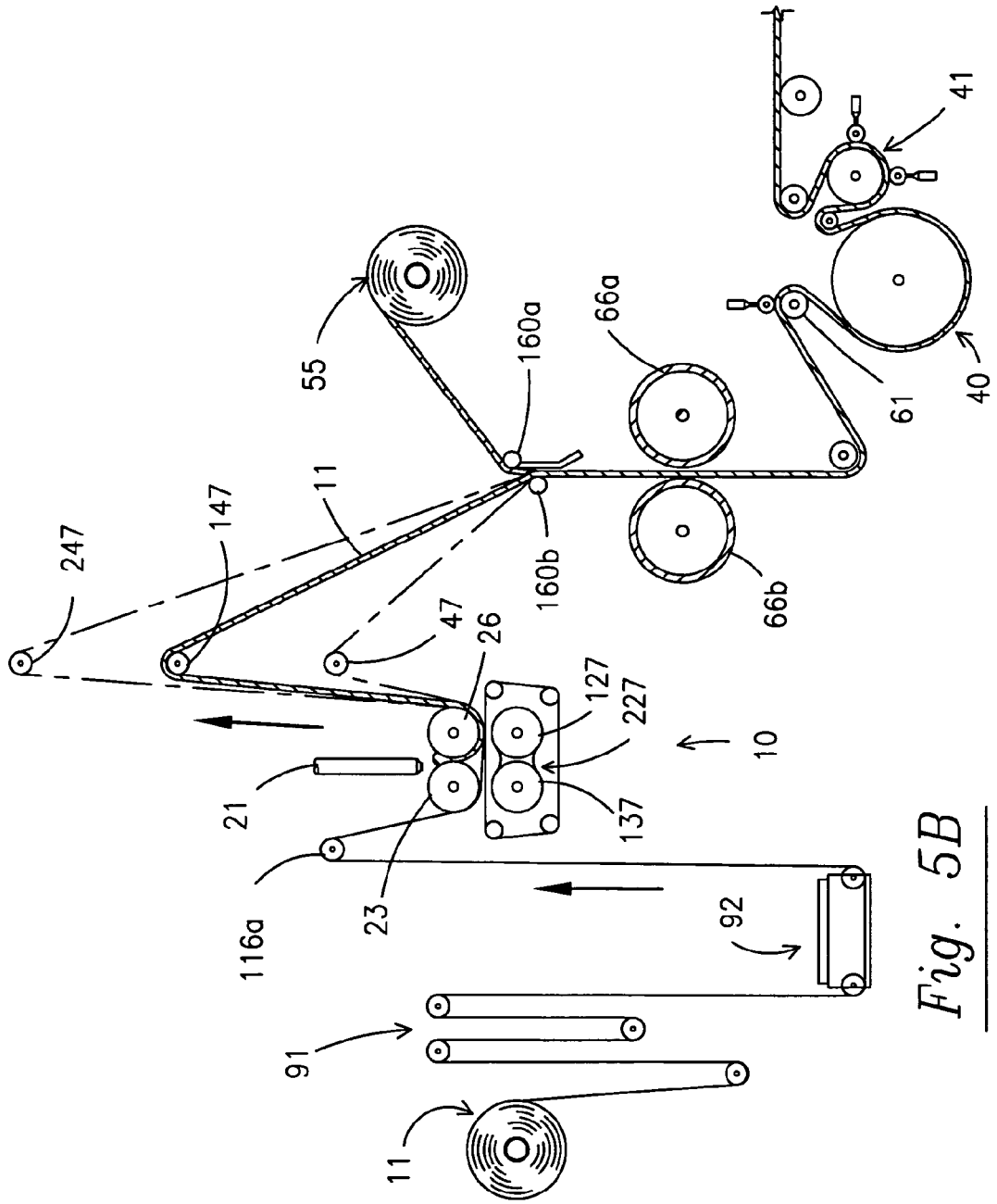
Figure 5C:
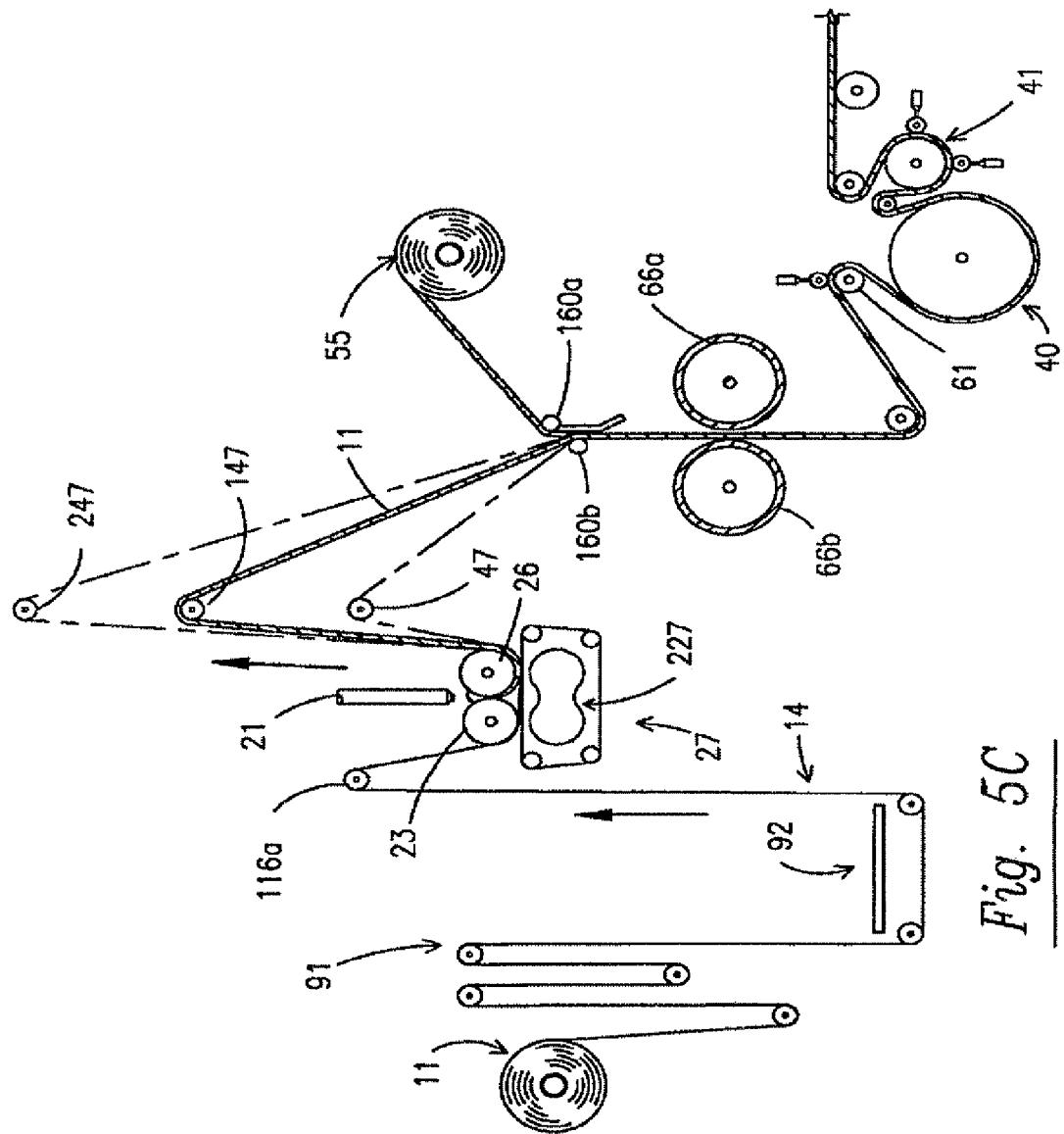

FIG. 5B illustrates the polyurethane application, marriage and heating of the FIG. 5A in greater detail. FIG. 5C illustrates an alternative construction of the embodiment of FIG. 5B wherein the support rolls 127, 137 in the support or backup structure 27 of FIG. 5B are replaced by air bladder 227. The air bladder 227 can more closely conform to the shape of the tensioning and application rollers 23, 26 and preferably urges a Teflon belt or other low friction material against the face 14 of the greige 11 and provides good results for some products. The air bladder 227 may aid in transferring the polyurethane from the application roller and may help achieve initial penetration. Again, the moveable tenter roller 147 controls the distance between the application of polyurethane material and the marriage point at pinch rollers 160a, 160b and the carpet proceeds around first and second heat drums 40,41 which are typically heated to at least 70° C., and are optimally kept at a temperature of about 85° C. to 90° C.

Figure 5D:
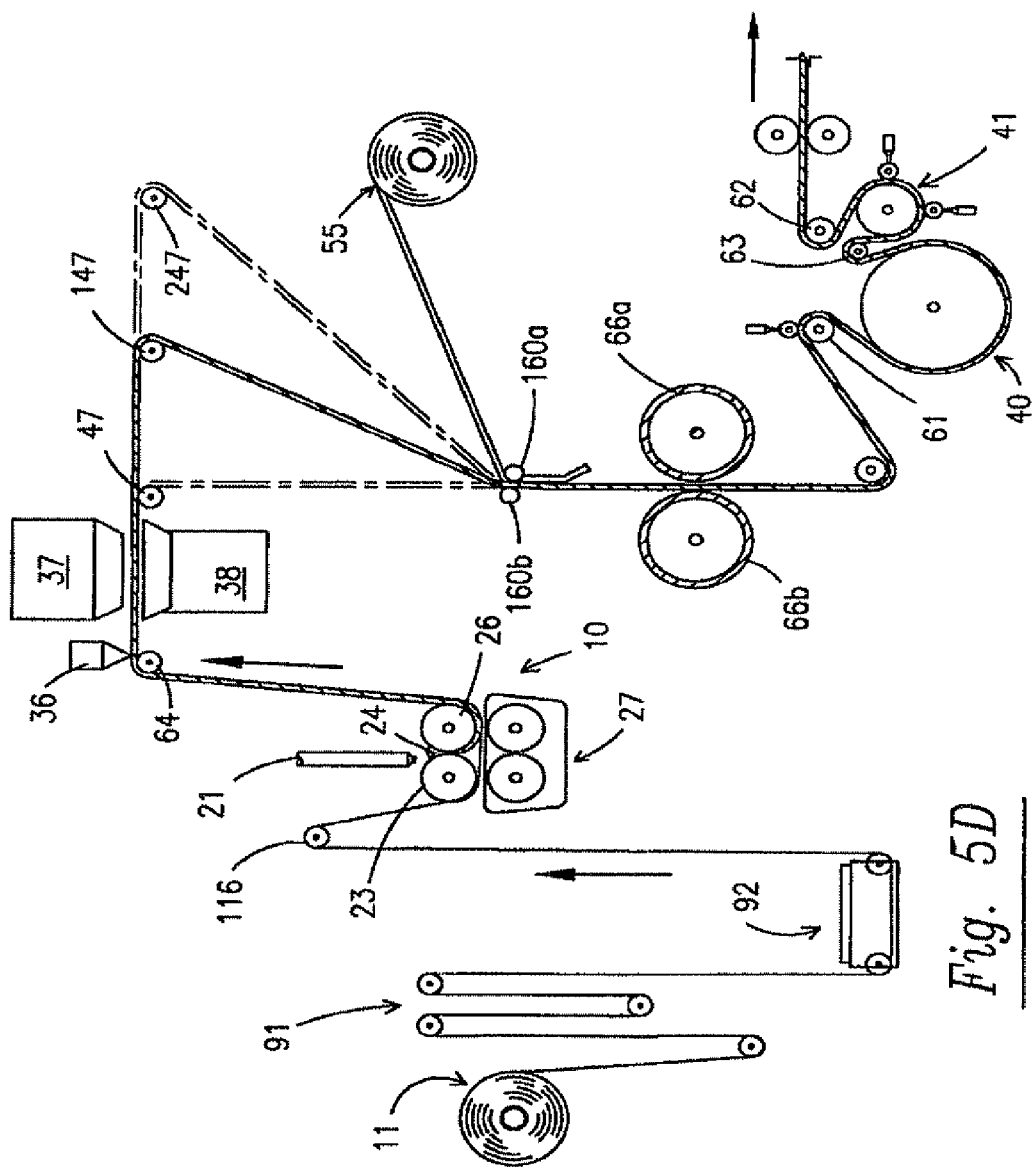
Figure 9:
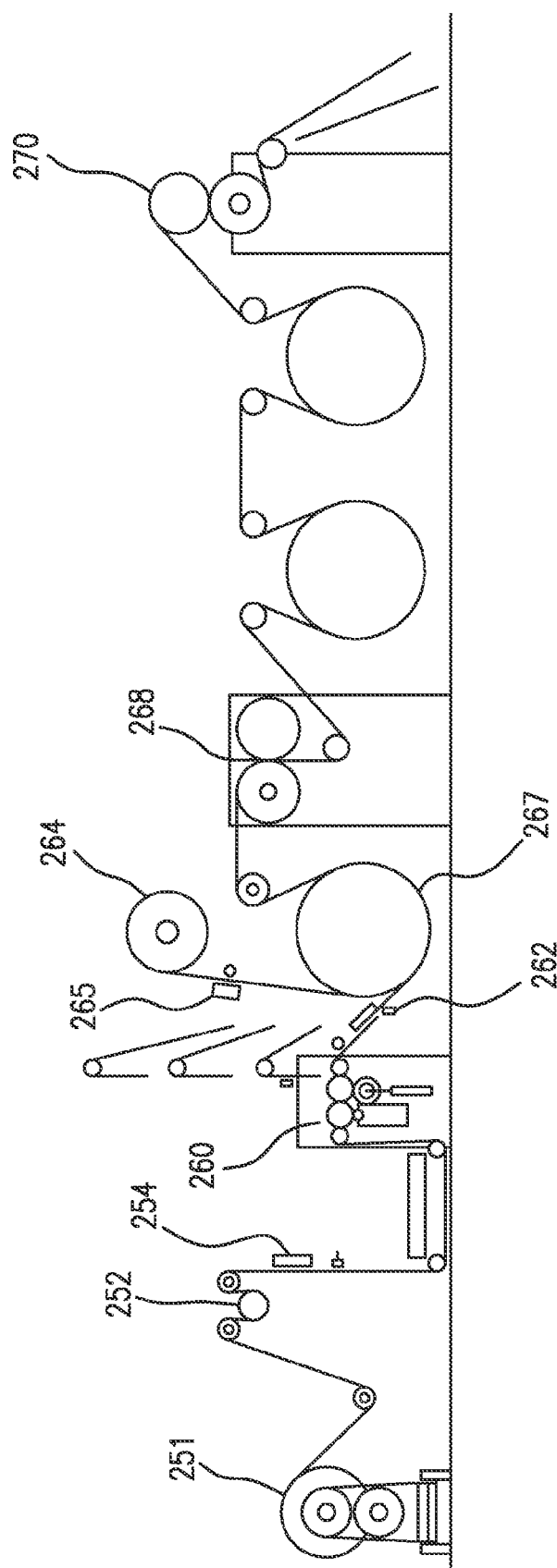
FIG. 9 illustrates a configuration of a carpet backing process line.

Finally, FIG. 5D shows yet another alternative configuration for the application of polyurethane material through rollers 23, 26. Again, the greige passes through a J-box 91 and then through a tenter frame 92 prior to proceeding to polyurethane dispensing apparatus 10. The greige 11 can be additionally conditioned by passing through a pattern straightener or steam box if desired. The greige 11 then proceeds beneath rollers 23,26 which supply polyurethane material from puddle 24. Penetration of the polyurethane material is increased by the pressure of ultrasonic doctor blade 36 against the coated greige 11 as it passes over support roller 64. Then blower 37 and vacuum 38 also act upon the polyurethane material to increase penetration of the fibers of the yarn back stitch and any primary backing fabric comprising the greige. For certain types of carpet materials, a corona treatment may also be used to enhance penetration. A corona treatment may aid in removing spinning oils and/or lubricants from solution dyed products. The example embodiment shown in FIG. 9 illustrates such a corona treatment. In this example embodiment, the greige proceeds from a roller 251 via a brake roller 252 to a flame treatment device 254 and then to the polyurethane application stage 260, which may be arranged as described above. After polyurethane has been applied to the greige, it is heated by an infrared unit 262 and then married to the non-woven backing 264, which is pre-treated using the corona treatment device 265. The married greige and backing is roller over drying can 267 and fed through a padder 268. The conveyance of the married carpet is facilitated by pulling device 270.

It may be possible to remove lubricants via steam prewashing or flame treatment in addition to the corona treatment. For a non-woven backing, a corona treatment may also be required to yield a suitable bond. Moveable tenter roll 147 controls the distance between the polyurethane application apparatus 10 and marriage point at nip wheels 160a, 160b and the reaction time of polyurethane materials can be additionally controlled by the temperature of the air applied from blower 37. The carpet again proceeds around heat cans 40, 41 to iron the secondary backing 55 to the greige 11 and accelerate the cure process. In some cases, shearing machines, trimmers, and other finishing equipment can be located between heat cans 40, 41 and roll up.

Figure 7A:
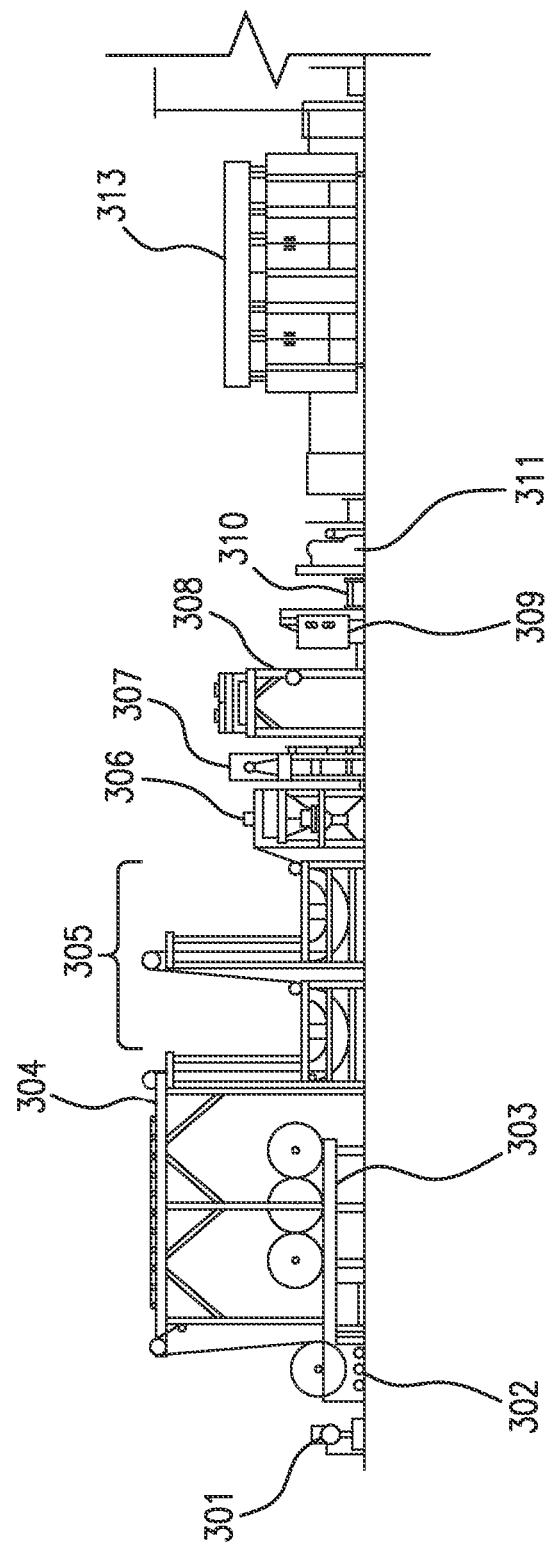
Figure 7B:
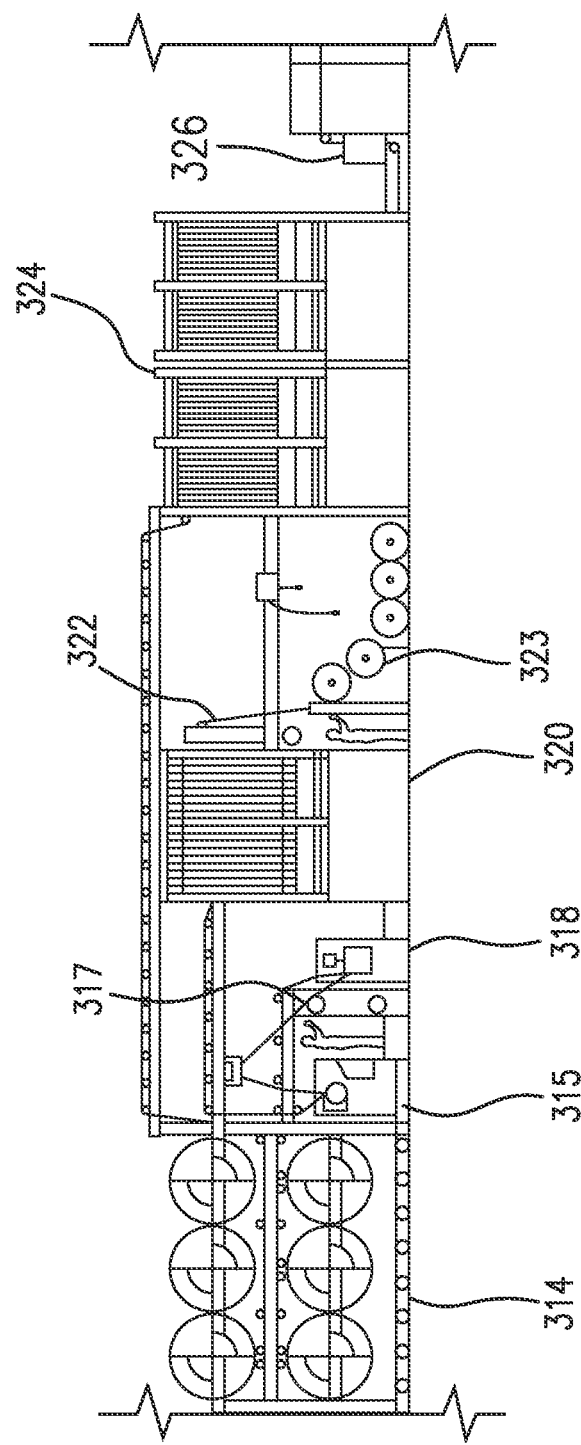

FIGS. 7A-7C illustrate, in sequence, first, second and third portions of an example embodiment of an entire carpet backing process line. As shown in FIG. 7A, a sewing machine 301 applies sews the greige, which is conveyed to a roller 302 which unrolls the greige. The greige is then conveyed to a staging table 303 supported by an overhead framework 304 and delivered through dual J-boxes 305 to a duplex beater 306. After being mechanically treated at the beater 306, the greige is heated at a single-loop pre-steamer and then directed via guider 308 to a bow and weft straightener 309. The greige is then conveyed to a fluicon with a static mixer, pump station and three-loop instamix 311 for application of adhesive and/or other chemical agents. The greige is then transported to a two-section dryer 313.

As shown in FIG. 7B, the greige is then dry-heated in drying cans 314 to remove further moisture. The greige is then conveyed via a pad 315 and pull roller 317 to the polyurethane application stage 318. After the polyurethane is applied the greige is sent through an accumulator which may have a capacity to hold 300 feet of carpet. From the first accumulator 320, the greige is conveyed via a non-woven unwind roller 323 adjusted using compensator 322 to secondary accumulators 324.

In the next processing stage, the greige is lifted by a pile raiser 326 to a shearing stage 327 (shown in FIG. 7C). The sheared greige is conveyed through a third accumulator 328 and finally transported via a compensator 329 to a carpet roller 330.

Figure 8:
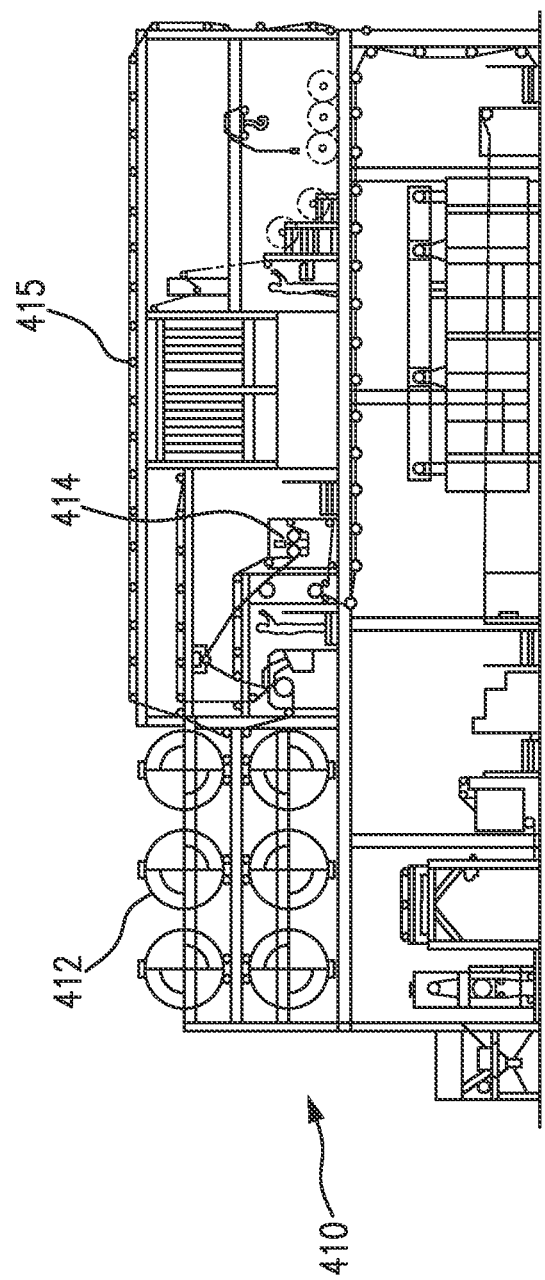
FIG. 8 illustrates a configuration of the second portion of the carpet backing process line.

FIG. 8 illustrates an example embodiment of the second portion 410 of the carpet backing process line. In this example embodiment, the drying cans 412, polyurethane application stage 414, and first accumulator 415 (corresponding to the second portion shown in FIG. 7B) are arranged (and supported) above the first portion so that the greige is conveyed vertically to the second portion rather than horizontally. After proceeding through the second portion 410, the greige is conveyed vertically downwards to the third stage.

Polyurethane prepolymers useful in the practice of the present invention are prepared by the reaction of active hydrogen compounds with any amount of isocyanate in a stoichiometric excess relative to active hydrogen material.

The prepolymer formulations of the present invention include a polyol component. Active hydrogen containing compounds most commonly used in polyurethane production are those compounds having at least two hydroxyl groups or amine groups. However, any active hydrogen containing compound can be used with the present invention, and indeed some soy based oils can be used.

In the practice of the present invention, preferably at least 50 weight percent of the active hydrogen compounds used to prepare the polyurethane is a polyol having molecular weight of from about 100-400.

The polyisocyanate component of the formulations of the present invention can be prepared using any organic polyisocyanates, modified polyisocyanates, isocyanate based prepolymers and mixtures thereof. These can include aliphatic or aromatic isocyanates. Preferably the isocyanate used to prepare the prepolymer formulation of the present invention is methyl diisocyanates such as Bayer's 142L or Dow p901 or blends of equal type.

Catalysts suitable for use in preparing the polyurethane of the present invention include tertiary amines, and organometallic compounds and mixtures thereof. For example, suitable catalysts include stannous octoate, triethylenediamine, N-methyl morpholine, like compounds and mixtures thereof. The catalysts do not necessarily need elevated activation temperatures or other promoters to initiate polymerization.

Surfactants can be useful for preparing a stable dispersion of the present invention. Surfactants useful for preparing a stable dispersion can be cationic, anionic, or non-ionic surfactants. Preferably the surfactants used to prepare the prepolymer formulation of the present invention are silicone surfactants such as Dow Corning DC-194 or Union Carbide's L-540. A surfactant can be included in a formulation of the present invention in an amount ranging from about 0.01 to about 7 parts per 100 parts by weight of polyurethane component.

A compound of the present invention optionally includes a filler material. The filler material can include conventional fillers such as milled glass, calcium carbonate, aluminum trihydrate, barium sulfate, fly ash, dyes and pigments or fire retardants (aluminum trihydrate and Tris polyolefin glycol). Preferably the filler can be present in an amount ranging from 0 to 600 parts, and more preferably between 100 and 500 parts, per 100 parts of the polyol component. With the use of thinning and penetration enhancing additives, it is possible to achieve satisfactory results with as much as 550 to 600 parts filler to 100 parts of polyol. According to the invention, utilizing greige goods comprising a backing fabric tufted with level loop yarns and the application of polyurethane materials containing a combination of polyol, isocyanate, and catalyst at a rate of 90 grams per square yard, together with fillers, penetrants and other extenders, the resulting carpet achieves a tuft bind of at least 6.25 pounds measured according to ASTM standards and delamination strength in excess of at least 2.5 pounds. Indeed, when using spun bonded polypropylene secondary backing material, which is possible due to the absence of oven curing, the secondary backing will often tear prior to delamination. When the same rate of 90 grams of isocyanate, polyol and catalyst per square yard is applied to greige comprising a backing fabric tufted with cut pile yarns, the tuft bind exceeds 3 pounds per square inch and delamination strength again achieves at least about 2.5 pounds per square inch. When the rate of application of the isocyanate, polyol and catalyst material is at the rate of 150 grams per square yard, the tuft bind of level loop carpet may reach 15 pounds and the resulting carpet far exceeds all customary structural standards required for residential or commercial carpet. Furthermore, the resulting carpet utilizing the polyurethane binder to attach the secondary backing is mold and mildew resistant, non-allergenic, easier to install, and less subject to degradation when subjected to extreme heat and cold. In addition, the manufacturing process utilizes a minimal amount of water compared to the process of utilizing a latex binder, utilizes less energy, and results in less waste products.

Generally, any method known to one skilled in the art of preparing polyurethane froths can be used in the practice of the present invention to prepare a polyurethane froth suitable for preparing a carpet of the present invention, however, typically only one of the prepolymer mixtures is frothed, since the use of water as a blowing agent provides ample volume to the polyurethane. It is also possible to froth the polyurethane mixture in the mix head by adding air or inert gas at that point.

Although a preferred embodiment of the present invention has been disclosed herein, it will be understood that various substitutions and modifications may be made to the disclosed embodiment described herein without departing from the scope and spirit of the present invention as recited in the appended claims.

What is clamed is:

1. A device for applying a polyurethane mixture to a backstitch side of a greige, comprising:
    a tensioning roller rotatable in a first direction;
    an application roller arranged adjacent to the application roller and rotatable in a second direction opposite to the first direction, the tensioning roller and the application roller positioned transversely and adjacent to a path of travel of the greige on the backstitch side of the greige, the tensioning roller rotatable in the feed direction of the greige and arranged to engage the greige;
    a polyurethane dispenser configured to create a puddle of polyurethane mixture including polyol, isocyanate, filler, and a catalyst, the polyurethane dispenser disposed between the tensioning roller and the application roller; and
    a first pressure element arranged opposite to the tensioning roller configured to press the greige therebetween and a second pressure element arranged opposite to the application roller configured to press the greige therebetween wherein the first pressure element and the second pressure element are configured for vertical upward motion to provide upward pressure against the greige upon coating of the backstitch side of the greige that begins to cure into a polyurethane foam.

2. The device according to claim 1, further comprising an air knife for shaping the puddle of the polyurethane mixture with forced air.

3. The device according to claim 1, wherein the polyurethane dispenser includes oscillating dispensing heads configured to dispense the polyurethane mixture between the application roller and the tensioning roller, the oscillating dispensing heads oscillating laterally across the greige between the application roller and the tensioning roller.

4. The device according to claim 3, wherein the oscillating dispensing heads includes a plurality of dispensing heads oscillating laterally across the greige between the application roller and the tensioning roller.

5. The device according to claim 1, further comprising an ultrasonic doctor blade located downstream of the application roller for penetrating the polyurethane mixture into the backstitch side of the greige.

6. The device according to claim 1, wherein the tensioning roller is arranged upstream of the application roller in the path of travel of the greige.

7. The device according to claim 1, wherein the tensioning roller and the application roller are positioned above the path of travel of the greige.

8. The device according to claim 1, wherein the tensioning roller is rotatable at a speed different from a speed of travel of the greige.

9. The device according to claim 1, wherein the application roller is rotatable at a speed different from a speed of travel of the greige.

10. The device according to claim 1, wherein the application roller is rotatable at a first speed and the tensioning roller is rotatable at a second speed.

11. The device according to claim 10, wherein the first speed and the second speed are different.

12. The device according to claim 1, wherein a space between the application roller and the tensioning roller is adjustable.

13. The device according to claim 1, wherein the polyurethane dispenser includes at least one dispensing head configured to oscillate laterally across the travel path of the greige between the application roller and the tensioning roller.

14. The device according to claim 1, wherein the dispenser includes a plurality of dispensing heads configured to oscillate laterally across the travel path of the greige between the application roller and the tensioning roller.

15. The device according to claim 1, wherein the tensioning roller is rotatable at a speed less than a speed of travel of the greige.

16. The device according to claim 1, wherein the application roller is rotatable at a speed greater than a speed of travel of the greige.

17. The device according to claim 1, further comprising an ultrasonic device positioned downstream of the application roller in the path of travel of the greige and configured to impart ultrasonic energy to the greige to penetrate the polyurethane mixture into the backstitch side of the greige.

18. The device according to claim 1, wherein the at least one pressure element includes at least one roller.

19. The device according to claim 1, wherein the first pressure element includes a first roller and the second pressure element includes a second roller.

20. The device according to claim 1, further comprising an air dam configured to maintain and shape the puddle of the polyurethane mixture with pressurized air.

* * * * *